United States Patent
Shih

(10) Patent No.: US 6,819,558 B2
(45) Date of Patent: Nov. 16, 2004

(54) COVER FOR DISK STORAGE DEVICE ARRAY SERVER

(76) Inventor: Shoei-Yuan Shih, No. 8, Lane 85, Hsing-I Rd., Pei-Tou Dist., Taipei (TW)

(*) Notice: Subject to any disclaimer, the term of this patent is extended or adjusted under 35 U.S.C. 154(b) by 328 days.

(21) Appl. No.: 10/060,259

(22) Filed: Feb. 1, 2002

(65) Prior Publication Data

US 2003/0147210 A1 Aug. 7, 2003

(51) Int. Cl.[7] .................................................. G06F 1/16
(52) U.S. Cl. ........................ 361/687; 361/681; 361/683
(58) Field of Search ................................ 361/679, 681, 361/683–687

(56) References Cited

U.S. PATENT DOCUMENTS 6,061,250 A * 5/2000 Lavan ........................ 361/797

* cited by examiner

Primary Examiner—Yean-Hsi Chang
(74) Attorney, Agent, or Firm—Birch, Stewart, Kolasch & Birch, LLP

(57) ABSTRACT

A cover with a panel thereon for a disk storage device array server is disclosed. The cover includes a panel, a joint, and a pivot connection unit. The joint is located near a bottom corner of the cover. A fixture penetrates through the joint to the cover is connected to a front surface of the server. The pivotal connection unit is located on a panel receiving area of the cover. A positioning member penetrates through the pivot connection unit, such that the panel is pivotally connected to the cover.

4 Claims, 6 Drawing Sheets

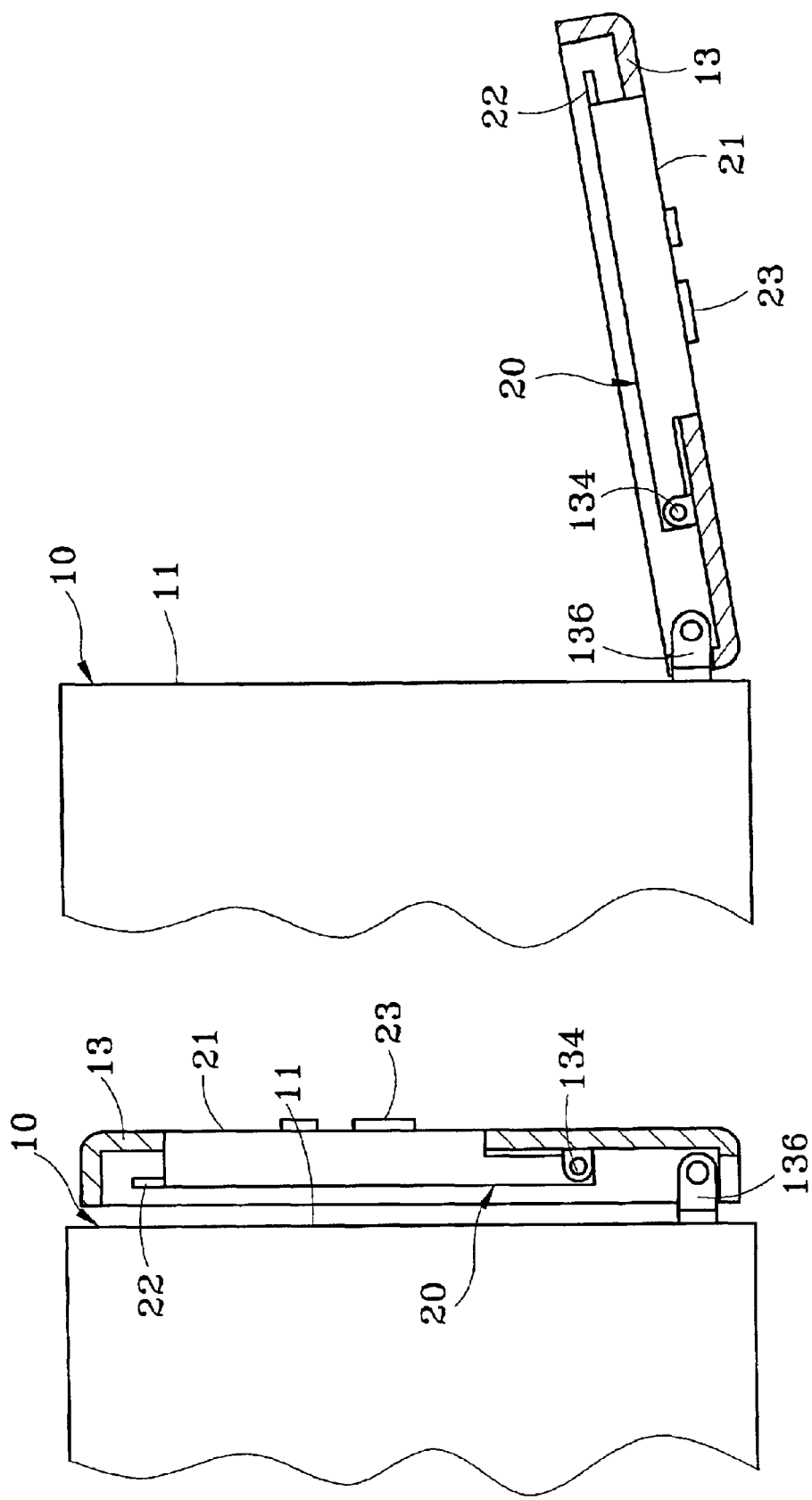

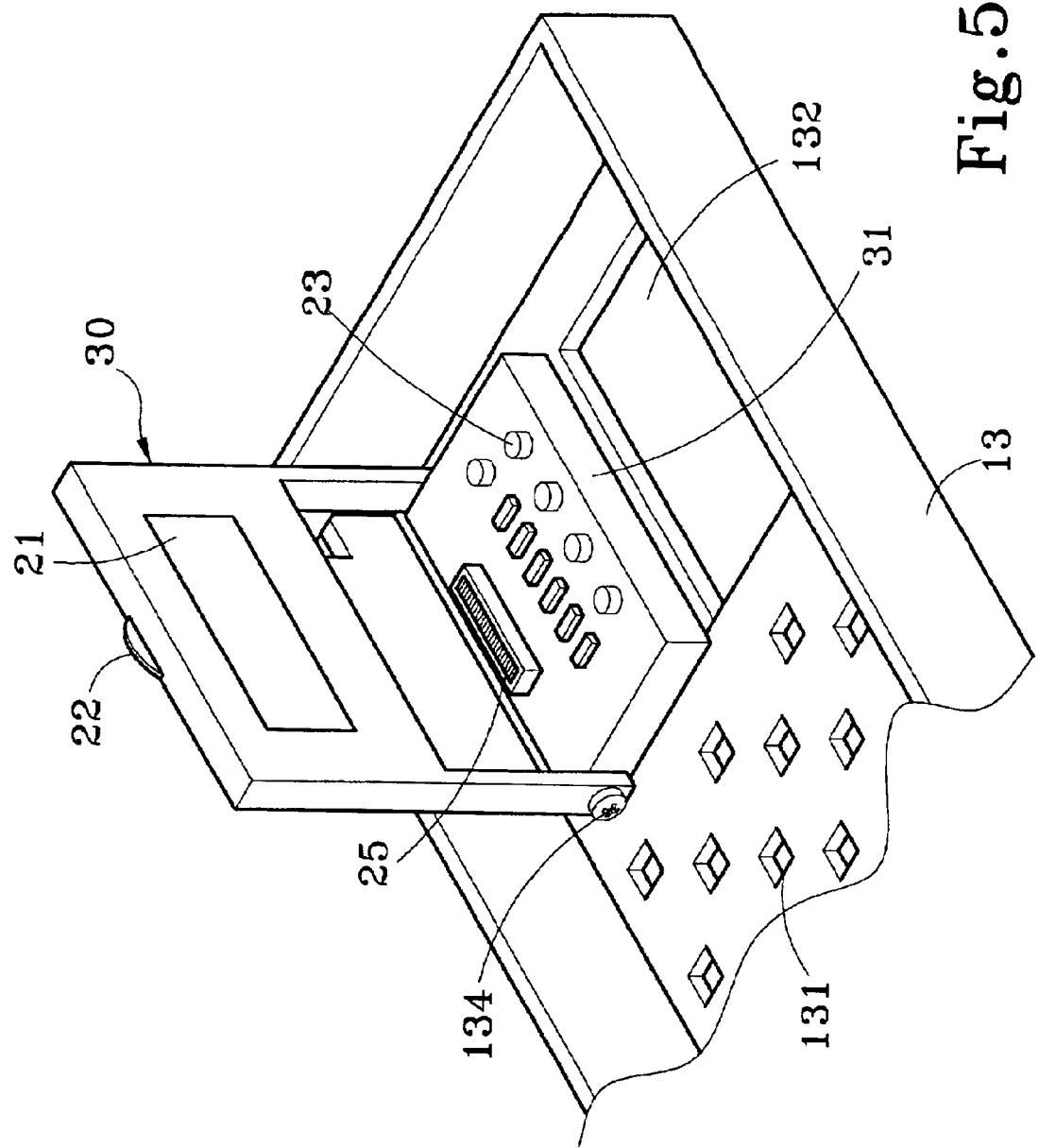

COVER FOR DISK STORAGE DEVICE ARRAY SERVER

FIELD OF THE INVENTION

The invention relates to a cover for a disk storage device array server. More specifically, the invention relates to a cover with a panel thereon for a disk storage device array server.

BACKGROUND OF THE INVENTION

Under a specification limitation of a disk storage device array server, many attempts have been made to increase the number of elements in the server.

For example, TW patent applications No. 90205730 and 90205876, assigned to the same applicant and filed on Apr. 13, 2001 and Apr. 16, 200, respectively, have proposed different approaches. The disclosures thereof are incorporated here by reference.

Usually, the location of a panel on a cover of the disk storage device array server is varied based on types of the server and the number of the disk storage device. For example, in a current 3U server, 9–12 disk storage devices are included, as shown in FIG. 1. The panel is located on the server. However, as the computer upgrades and the internet spreads faster and faster, 9–12 disk storage device array server can not meet consumer's requirements. Therefore, there is a need of a cover that can be used for all types of the disk storage device array server and increases the number of disk storage device.

SUMMARY OF THE INVENTION

It is therefore a principal object of the invention to provide a cover for all types of the disk storage device array server and increasing the number of disk storage device more than 12.

In order to achieve the above and other objectives of the invention, a cover with a panel thereon for a disk storage device array server is disclosed. The cover includes a panel, a joint, and a pivot connection unit. The joint is located near a bottom corner of the cover. A fixture penetrates through the joint to the cover is connected to a front surface of the server. The pivotal connection unit is located on a panel receiving area of the cover. A positioning member penetrates through the pivot connection unit, such that the panel is pivotally connected to the cover.

BRIEF DESCRIPTION OF THE DRAWINGS

The drawings included herein provide a further understanding of the invention and, incorporated herein, constitute a part of the invention disclosure. A brief introduction of the drawings is as follows:

FIG. 4A, FIG. 4B and FIG. 4C are views illustrating a server with a panel in use according to one embodiment of the invention; and FIG. 5 is another view illustrating a server with a panel in use according to one embodiment of the invention.

DESCRIPTION OF THE PREFERRED EMBODIMENTS

Figure 1:
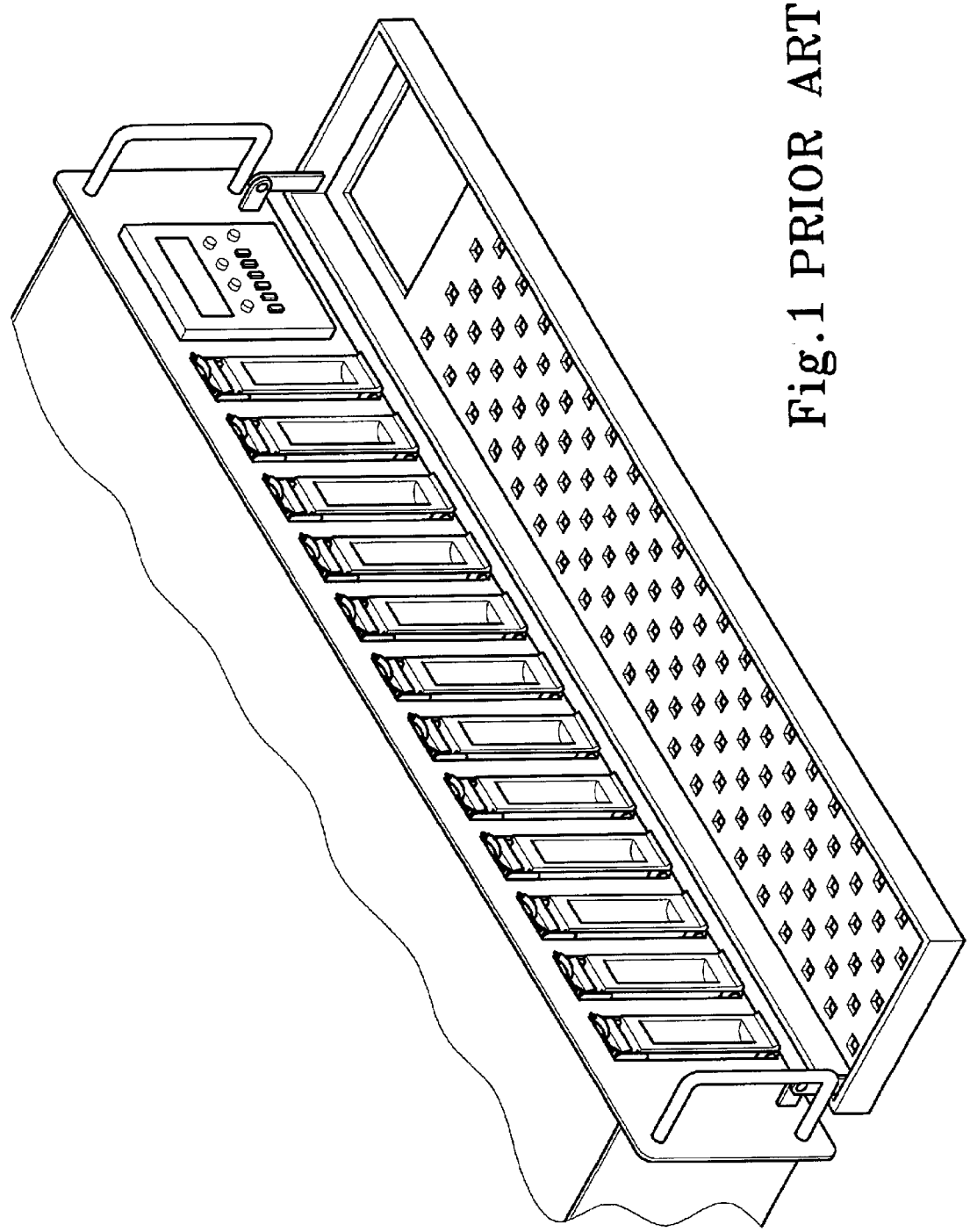
FIG. 1 is a schematic view illustrating a conventional disk storage device array server.

Wherever possible in the following description, similar reference numerals and symbols will refer to similar elements unless otherwise illustrated.

Figure 2:
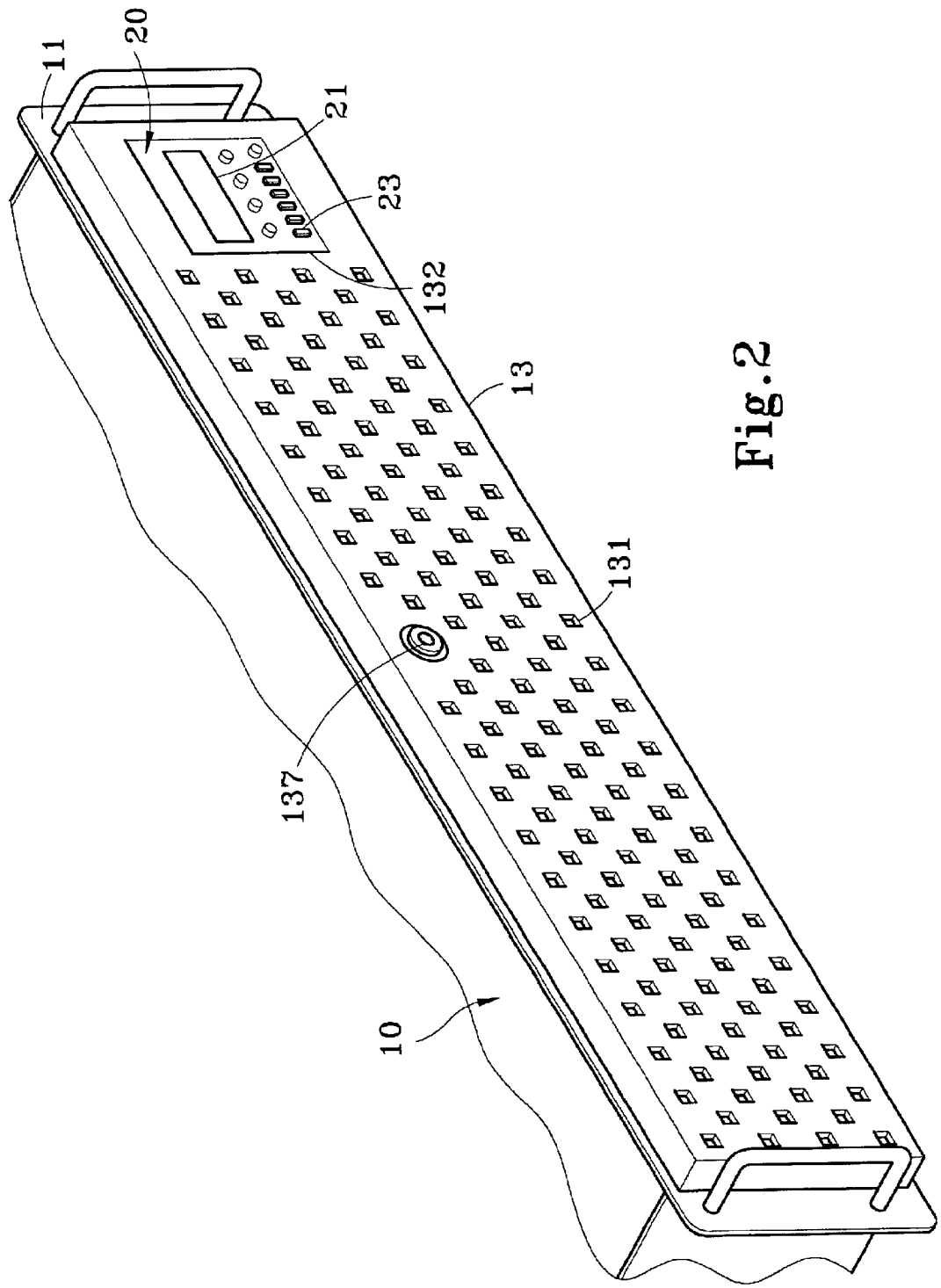
FIG. 2 is a schematic view of a cover with a panel thereon for a disk storage device array server according to one embodiment of the invention.
Figure 3:
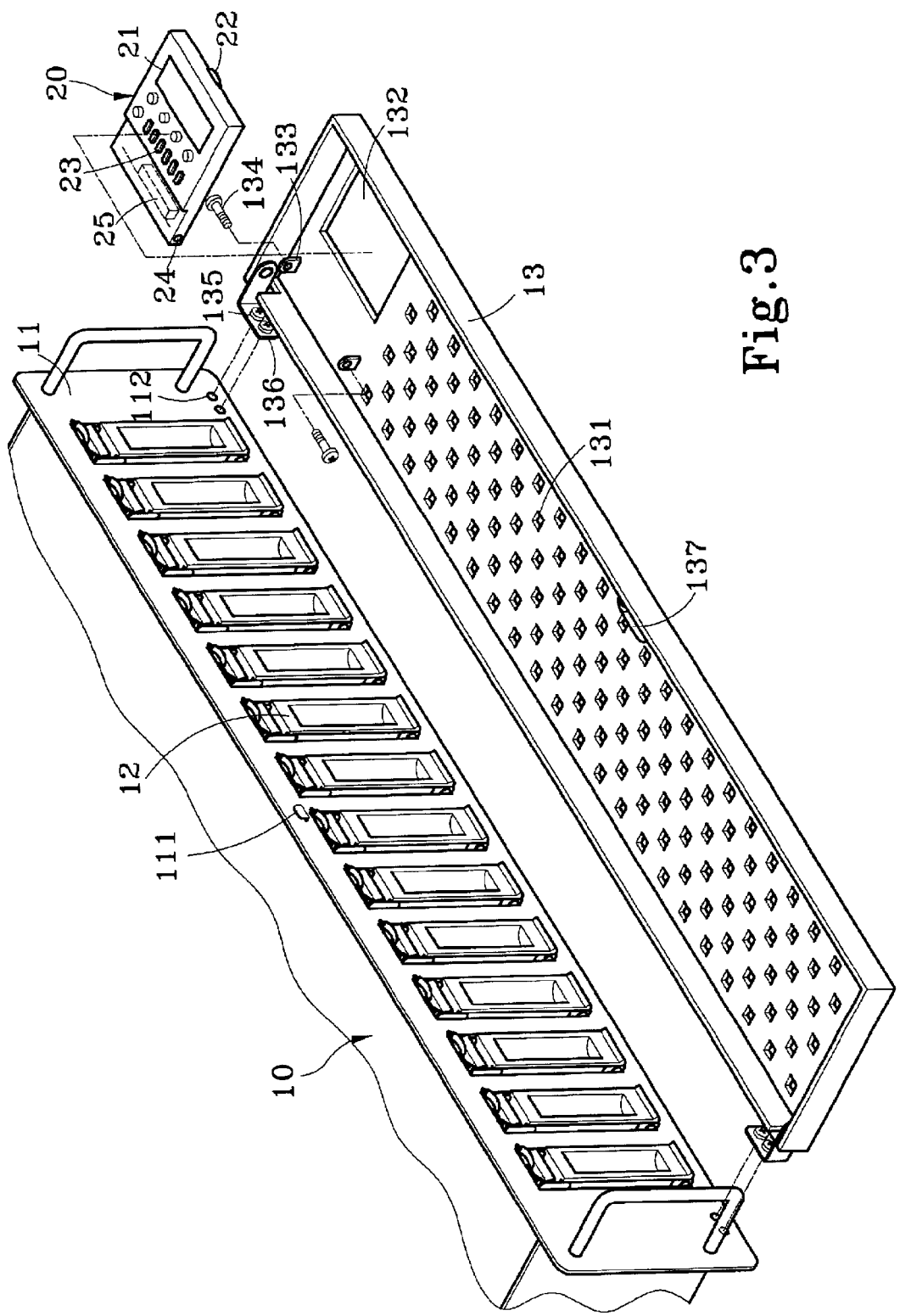
FIG. 3 is an exploded view of a disk storage device array server with a panel according to one embodiment of the invention.

FIG. 2 is a schematic view of a cover with a panel thereon for a disk storage device array server according to one embodiment of the invention. FIG. 3 is an exploded view of a disk storage device array server with a panel according to one embodiment of the invention. A panel 20 is arranged on a cover 13 of a disk storage device array server 10 to increase the number of disk storage device 12. A fixture 135 penetrates through a joint 136 and a hole 112 on the front surface 11 of the server 10. The joint 136 is located near a bottom corner of the cover 13. Thereby, the cover 13 is connected to a front surface 11 of the server 10 through the joint 136. A locker 137 is located on an upper location of the cover 13. At an upper portion of the server 10 where corresponds to the locker 137 is provided with a firmware 111. When the cover 13 is closed to the server 10 by means of rotating around the joint 136, the locker 137 engages with the firmware 111. The cover 13 is further provided with a plurality of openings 131 for heat dissipation. The panel 20 includes a monitor 21, a control set 23, and a connection port 25. The cover 13 has a panel receiving area, on which a pivotal connection unit including two positioning holes 24 and two positioning members 133 is provided. The positioning holes 24 are respectively located on ends of the panel 20 and the positioning members 133 are located on the cover 13, such that the panel 20 can be pivotally connected to the cover 13 by penetrating a positioning member 134 through the positioning holes 24 and the positioning members 133.

Figure 4C:
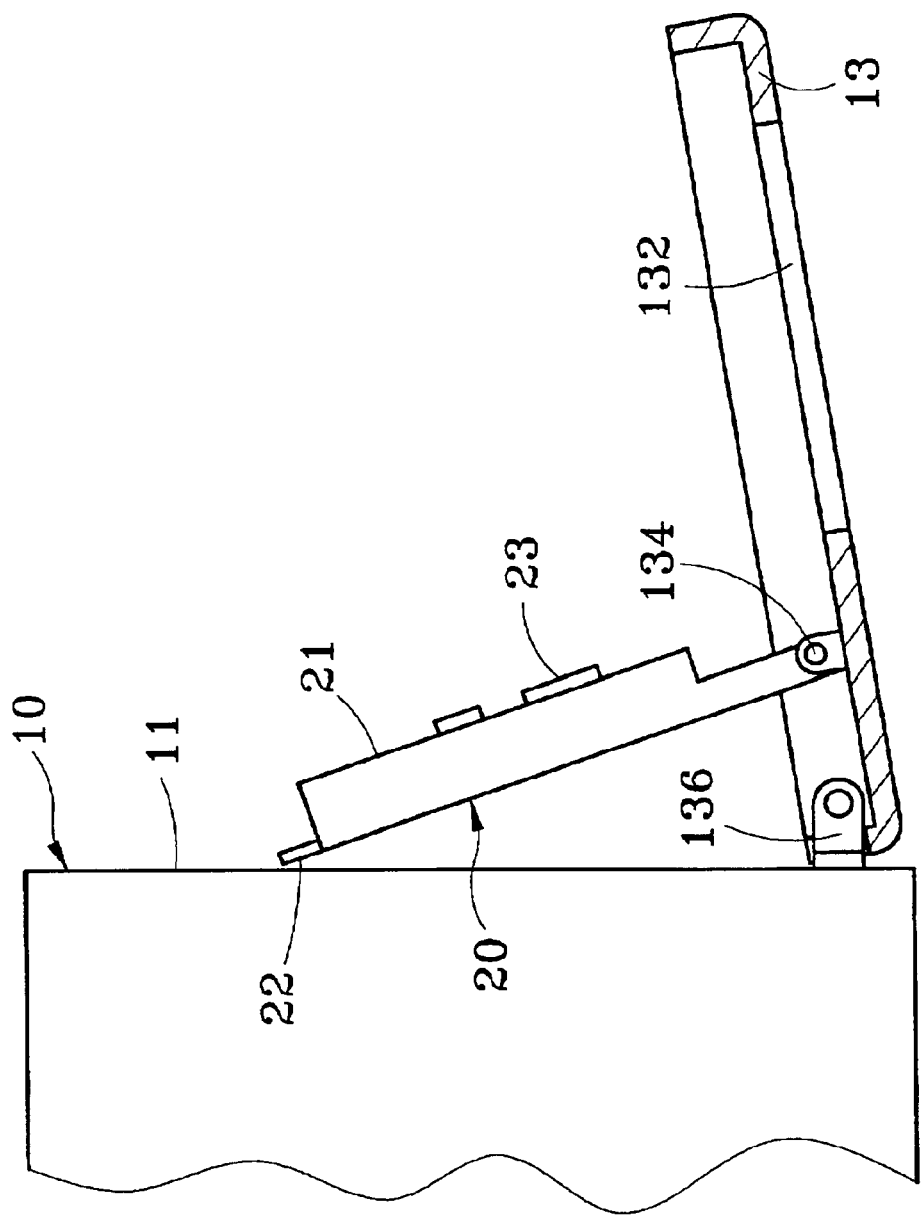

FIG. 4A, FIG. 4B and FIG. 4C are views illustrating a server with a panel in use according to one embodiment of the invention. The panel receiving area of the cover 13 is provided with an opening 132 to expose the panel 20. When the cover 13 is closed to the server 10, the panel still can be controlled through the opening 132. When operation of the disk storage device 12 is to be performed, the locker 137 is detached from the firmware 111, and the cover 13 is rotated around the joint 136 until the cover 13 is at a lower level than the disk storage device 12. The panel 20 is further provided with a protrusion 22 that is convenient for a user to hold and open the panel 20. The panel 20 can be opened in a way that the panel 20 is pivoted until the protrusion 22 is against the disk storage device 12. In this situation, the disk storage device 12 is behind the panel 20, while the monitor 21 and the control set 23 face to the user. Thereby, the user can easily handle all the disk storage devices 12. Further, since the panel 20 is arranged on the cover 13, the whole server 10 can receive more devices 12 than that having a panel thereon.

After the panel 20 is handled, the panel 20 is pushed toward the cover 13, and then the cover 13 is pushed toward the server 10.

FIG. 5 is another view illustrating a server with a panel 20 in use according to one embodiment of the invention. The control set 23 and the connection port 25 of the panel 20 are located on a base 31 of the cover 13. The monitor 21 of the panel 20 is arranged on a rack 30. The rack 30 and the base 31 are pivotally connected to each other by a positioning member 134. Only the monitor 21 of the panel 20 is exposed in order to prevent incautious touching the control set 23 and the connection port 25.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A cover with a panel thereon for a disk storage device array server, the panel comprising a monitor, a control set and a connection port, and the cover comprising:

a joint located near a bottom corner of the cover;

a fixture penetrating through the joint, thereby the cover is connected to a front surface of the server;

a pivotal connection unit on a panel receiving area of the cover; and a positioning member penetrating through the pivot connection unit, such that the panel is pivotally connected to the cover;

wherein the control set and the connection port of the panel are arranged on a base, and the monitor of the panel is arranged on a rack, such that the rack is pivotally connected to the base by the positioning member.

2. The cover of claim 1, wherein the cover is further provided with a plurality of openings for heat dissipation.

3. The cover of claim 1, wherein at an upper portion of the panel is further provided with a protrusion that is convenient for a user to open the panel.

4. The cover of claim 1, wherein the pivot connection unit comprises a positioning hole and a positioning member.

* * * * *